United States Patent
Hayashi et al.

(10) Patent No.: US 10,518,445 B2
(45) Date of Patent: Dec. 31, 2019

(54) CAGE FOR ROLLING BEARING, AND ROLLING BEARING

(71) Applicant: NTN CORPORATION, Osaka (JP)

(72) Inventors: Takumi Hayashi, Mie (JP); Atsushi Tokuda, Mie (JP)

(73) Assignee: NTN CORPORATION, Osaka (JP)

(*) Notice: Subject to any disclaimer, the term of this patent is extended or adjusted under 35 U.S.C. 154(b) by 40 days.

(21) Appl. No.: 15/540,019

(22) PCT Filed: Dec. 21, 2015

(86) PCT No.: PCT/JP2015/085701
§ 371 (c)(1),
(2) Date: Jun. 26, 2017

(87) PCT Pub. No.: WO2016/104440
PCT Pub. Date: Jun. 30, 2016

(65) Prior Publication Data
US 2017/0348881 A1 Dec. 7, 2017

(30) Foreign Application Priority Data
Dec. 24, 2014 (JP) .................................. 2014-261212

(51) Int. Cl.
| | | |
|---|---|---|
| *B29C 45/00* | (2006.01) | |
| *C08J 5/04* | (2006.01) | |
| *F16C 19/16* | (2006.01) | |
| *F16C 33/44* | (2006.01) | |
| *C08K 7/06* | (2006.01) | |
| *C08K 7/14* | (2006.01) | |
| *C08K 7/00* | (2006.01) | |
| *F16C 33/38* | (2006.01) | |
| *C08K 3/04* | (2006.01) | |
| *C08K 3/40* | (2006.01) | |
| *C08K 3/013* | (2018.01) | |
| *B29K 77/00* | (2006.01) | |
| *B29K 105/12* | (2006.01) | |
| *B29K 307/04* | (2006.01) | |
| *B29K 309/08* | (2006.01) | |
| *B29L 31/04* | (2006.01) | |
| *F16C 33/41* | (2006.01) | |

(52) U.S. Cl.
CPC ...... *B29C 45/0001* (2013.01); *B29C 45/0005* (2013.01); *C08J 5/04* (2013.01); *C08K 3/013* (2018.01); *C08K 3/04* (2013.01); *C08K 3/40* (2013.01); *C08K 7/00* (2013.01); *C08K 7/06* (2013.01); *C08K 7/14* (2013.01); *F16C 19/16* (2013.01); *F16C 19/163* (2013.01); *F16C 33/3856* (2013.01); *F16C 33/44* (2013.01); *B29K 2077/00* (2013.01); *B29K 2105/12* (2013.01); *B29K 2307/04* (2013.01); *B29K 2309/08* (2013.01); *B29L 2031/04* (2013.01); *C08J 2377/06* (2013.01); *F16C 33/416* (2013.01); *F16C 2208/60* (2013.01); *F16C 2220/04* (2013.01)

(58) Field of Classification Search
None
See application file for complete search history.

(56) References Cited

U.S. PATENT DOCUMENTS

| | | | | |
|---|---|---|---|---|
| 5,118,207 A | * | 6/1992 | Ikejiri | .................. F16C 33/416 384/527 |
| 6,406,189 B1 | | 6/2002 | Boutreux | |
| 2012/0301065 A1 | | 11/2012 | Mori | |
| 2013/0062576 A1 | * | 3/2013 | Jha | ......................... C08L 71/12 252/511 |
| 2013/0301965 A1 | | 11/2013 | Himeno | |

FOREIGN PATENT DOCUMENTS

| | | |
|---|---|---|
| CN | 102725549 A | 10/2012 |
| EP | 1043511 A1 | 10/2000 |
| EP | 2530341 A1 | 12/2012 |
| FR | 2792043 A1 | 10/2000 |

(Continued)

OTHER PUBLICATIONS

International Search Report for PCT/JP2015/085701 dated Mar. 1, 2016.

(Continued)

*Primary Examiner* — Ana L. Woodward
(74) *Attorney, Agent, or Firm* — Hedman & Costigan, P.C.; James V. Costigan; Kathleen A. Costigan

(57) ABSTRACT

Provided are that a cage for a rolling bearing in which seizure or break is not generated under a condition of a high temperature and a high speed in which a dm·n value is not less than 80×10$^4$, and a rolling bearing using the cage. The rolling bearing 1 is provided with an inner ring 2, an outer ring 3, a plurality of rolling elements 4 interposed between the inner ring and the outer ring and a cage 5 which retains the rolling elements 4. The cage 5 is formed by injection molding a resin composition. The resin composition comprises polyamide resin made from a dicarboxylic acid component and a diamine component as a base resin and a fiber reinforcing member added. The dicarboxylic acid component contains terephthalic acid as a main component. The diamine component contains 1,10-diaminodecane as a main component. The fiber reinforcing member contains 15 to 50 mass % of glass fibers or 10 to 35 mass % of carbon fibers based on the whole resin composition.

6 Claims, 4 Drawing Sheets

(56) References Cited

FOREIGN PATENT DOCUMENTS

| | | |
|---|---|---|
| JP | 04-327024 A | 11/1992 |
| JP | 08-232945 A | 9/1996 |
| JP | 2000-045049 A | 2/2000 |
| JP | 2000-227120 A | 8/2000 |
| JP | 2000-291666 A | 10/2000 |
| JP | 2001-317554 A | 11/2001 |
| JP | 2006-207684 A | 8/2006 |
| JP | 2011/102303 A | 5/2011 |
| JP | 2011-153699 A | 8/2011 |
| JP | 2012-211622 A | 11/2012 |
| JP | 2013-064420 A | 4/2013 |
| WO | 2011/093376 A1 | 8/2011 |

OTHER PUBLICATIONS

English Abstract for JP 2000-227120 A dated Aug. 15, 2000.
English Abstract for JP 2001-317554 A dated Nov. 16, 2001.
English Abstract for JP 2006-207684 A dated Aug. 10, 2006.
English Abstract for JP 2013-064420 A dated Apr. 11, 2013.
English Abstract for JP 04-327024 A dated Nov. 16, 1992.
English Abstract for JP 08-232945 A dated Sep. 10, 1996.
English Abstract for JP 2011-153699 A dated Aug. 11, 2011.
English Abstract for CN 102725549 A dated Oct. 10, 2012.
English Abstract for JP 2012-211622 A dated Nov. 1, 2012.
English Abstract for JP 2000-291666 A dated Oct. 20, 2000.
English Abstract for EP 1043511 A1 dated Oct. 11, 2000.
English Abstract for FR 2792043 A1 dated Oct. 13, 2000.
English Abstract for JP 2000-045049 A dated Feb. 15, 2000.
English Abstract for JP 2011/102303 A dated May 26, 2011.

\* cited by examiner (a)

(b)

CAGE FOR ROLLING BEARING, AND ROLLING BEARING

TECHNICAL FIELD

The present invention relates to a cage for a rolling bearing used for vehicles, motors, machine tools or the like, in particular relates to a resin cage for a rolling bearing formed by molding a predetermined resin composition.

BACKGROUND ART

In a conventional ball bearing, as a cage which retains a plurality of rolling elements arranged in a rolling manner between a race surface of an outer ring and a race surface of an inner ring along a circumferential direction, a cage made of steel by means of press forming is generally used. However, in the cage made of steel, when a rotation speed of the bearing becomes fast, friction caused by sliding contact between the rolling element and the cage becomes large and rising temperature of the bearing becomes large, and as a result, seizure of the bearing might be caused. Thus, it is considered to be effective to use the cage formed by injection molding of synthetic resin which is superior to steel in a view of self-lubricant performance, low friction performance, light weight or the like. Generally, polyamide 6 resin, polyamide 66 resin, polyamide 46 resin or the like, which is reinforced by adding glass fiber as needed, is used (see Patent Document 1). Further, in order to further improve dimensional stability, heat resistance and chemical resistance, a cage in which polyamide 9T resin is used is proposed (see Patent Documents 2, 3).

PRIOR ART DOCUMENTS

Patent Documents

Patent Document 1: JP 2000-227120 A
Patent Document 1: JP 2001-317554 A
Patent Document 2: JP 2006-207684 A

SUMMARY OF THE INVENTION

Problems to be Solved by the Invention

In a case in which a rolling bearing into which a resin cage is installed is rotated at a high speed, centrifugal force caused by high speed rotation is applied to the cage and as a result, the cage might be deformed. When the cage is deformed, friction between the cage and a ball retained by the cage becomes large, and therefore heat generation of the bearing is caused. Further, when the cage is deformed, the cage is contacted with the outer ring of the bearing, and therefore the resin is melted by frictional heat caused by the contact and the rolling bearing might not be rotated (seized). Thus, such a resin cage installed into the rolling bearing used in high speed rotation is required not to be deformed by mechanical stress and/or thermal stress.

However, the mechanical characteristic of the synthetic resin is largely changed at a glass transition temperature, and strength and elastic module are decreased at a high temperature. In polyamide 66 resin or polyamide 46 resin as general material of the cage disclosed in Patent Document 1, the glass transition temperatures thereof are approximately 50° C. and approximately 80° C. respectively, and at temperature more than the glass transition temperature, as described above, after the deformation due to the centrifugal force is generated and the heat generation due to the sliding friction between the cage and the rolling element is increased and the temperature of the bearing is further increased, the cage and the outer ring are contacted with each other and therefore seizure or break of the cage might be caused. Thus, for example, in a case in which the cage is used in high speed rotation in which dm·n value (a product of a pitch diameter dm of the rolling element and a bearing ring rotation speed n) is not less than $60 \times 10^4$ (further, not less than $80 \times 10^4$), it is difficult to prevent damage due to the seizure and the break of the cage. Further, each of polyamide 66 resin and polyamide 46 resin has a high water absorption rate and a dimension of the cage is changed due to the high water absorption rate, and therefore the cage is needed to be used while managing the dimension of the cage in a moisture-absorbed state. Further, the strength and the elastic module of the cage after the moisture absorption is largely decreased compared to those before the moisture absorption.

On the other hand, in polyamide 9T resin disclosed in Patent Documents 2, 3, the glass transition temperature thereof is 125° C., and the glass transition temperature is high compared to the glass transition temperatures of polyamide 66 resin and polyamide 46 resin described above. However, also in polyamide 9T resin, in a case in which a lubricating state is deteriorated due to some causes against the temperature rising under a condition of high speed rotation, the temperature of the cage exceeds the glass transition temperature thereof and a problem such as deformation might be caused.

Further, since polyamide 9T resin is aromatic polyamide, water absorption performance is low compared to aliphatic polyamide such as polyamide 66 resin and polyamide 46 resin. However, since the resin cage formed by injection molding always has a weld portion formed in a region in which the resin composition is joined during the molding and further polyamide 9T resin has high elastic module and low toughness, stress concentration on the weld portion is generated in use and a crack is easily generated on the weld portion and therefore the strength of the cage might be decreased.

In this regard, in Patent Document 2, although the cage using polyamide 9T resin is proposed, seizure resistance thereof is not suggested. Further, in Patent Document 3, although it is described that the dm·n value is around $60 \times 10^4$ in the temperature rising, the strength of the cage including the weld portion is not suggested.

An object of the present invention is, in order to solve such a problem, to provide a cage for a rolling bearing and a rolling bearing using the cage in which seizure or break is not generated under a condition of a high temperature and a high speed in which a dm·n value is not less than $80 \times 10^4$.

Means for Solving the Problem

A cage for a rolling bearing according to the present invention is formed by injection molding a resin composition, and the resin composition comprises polyamide resin made from a dicarboxylic acid component and a diamine component as a base resin and a fiber reinforcing member added. The dicarboxylic acid component contains terephthalic acid as a main component. The diamine component contains 1,10-diaminodecane as a main component. The fiber reinforcing member contains 15 to 50 mass % of glass fibers or 10 to 35 mass % of carbon fibers based on the whole resin composition.

The polyamide resin has a melting point of not less than 310° C. Further, a remaining part other than the fiber reinforcing member in the resin composition consists of the polyamide resin. Further, the polyamide resin contains radioisotope carbon 14.

A rolling bearing according to the present invention includes an inner ring, an outer ring, a plurality of rolling elements interposed between the inner ring and the outer ring, and a cage which retains the rolling elements, and the cage is a cage for a rolling bearing according to the present invention. Especially, the rolling bearing is used in high speed rotation in which a dm·n value is not less than $80 \times 10^4$.

Effect of the Invention

The cage for the rolling bearing according to the present invention is formed by injection molding the resin composition in which 15 to 50 mass % of glass fibers or 10 to 35 mass % of the carbon fibers are added into a predetermined polyamide resin containing the dicarboxylic acid component, which contains terephthalic acid as a main component, and the diamine component, which contains 1,10-diaminodecane as a main component. With this configuration, rigidity (elastic module) is high and therefore deformation under a condition of a high temperature and high speed rotation can be made small. Accordingly, when the cage is used in high speed rotation in which the dm·n value is not less than $80 \times 10^4$, a heating value can be made small, and therefore seizure and break can be prevented. Further, since the polyamide resin containing the dicarboxylic acid component, which contains terephthalic acid as a main component, and the diamine component, which contains 1,10-diaminodecane as a main component, is used as base resin, a crystallization rate is extremely high, and therefore a cycle time in molding can be made short and productivity can be improved.

The polyamide resin described above provided as the base resin has the melting point of not less than 310° C. and therefore has extremely high heat resistance compared to polyamide 66 resin (melting point of 267° C.) and polyamide 46 resin (melting point of 295° C.) which are most generally used as material of the cage. Further, the heat resistance similar to or superior to that of polyamide 9T resin (melting point of 306° C.) is provided. Accordingly, the deformation under a condition of a high temperature and high speed rotation can be made small.

Further, the polyamide resin described above is superior to other polyamide resin in oil resistance and chemical resistance, and therefore the polyamide resin described above can be used under the severe usage condition, for example, in a high temperature, in oil or the like compared to the conventional usage condition. Further, the polyamide resin described above has a water absorption rate similar to that of polyamide 9T resin and extremely smaller than that of polyamide 66 resin and polyamide 46 resin, and therefore dimensional change and deterioration of physical properties due to water absorption can be suppressed as much as possible.

Since a part of the component which forms the polyamide resin (for example, 1,10-diaminodecane) is synthesized from a plant and the polyamide resin contains carbon 14 as a radioisotope, a substantial carbon dioxide emission in burning can be reduced compared to that of petroleum-derived synthetic resin.

Since the rolling bearing according to the present invention includes the inner ring, the outer ring, the plurality of the rolling elements interposed between the inner ring and the outer ring, and the cage which retains the rolling elements according to the present invention described above, a bearing which does not cause defects such as seizure and break of the cage when used in high speed rotation in which the dm·n value is not less than $80 \times 10^4$ can be provided.

MODE FOR CARRYING OUT THE INVENTION

Figure 1:
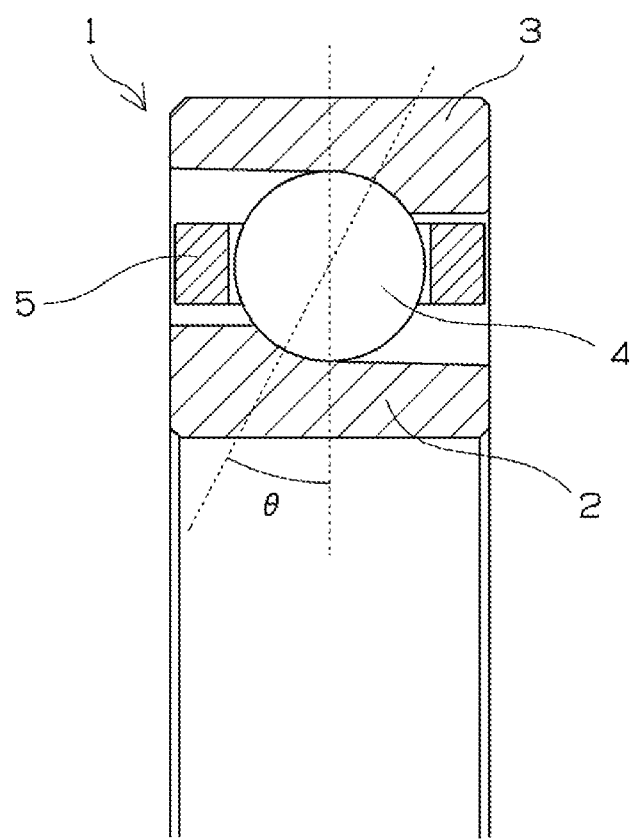
FIG. 1 is a cross-sectional view in an axial direction of an angular ball bearing.

A cage for a rolling bearing according to the present invention is a resin cage formed by injection molding a resin composition. The resin composition formed by resin material comprises predetermined polyamide resin as a base resin and a predetermined amount of a fiber reinforcing member (glass fiber or carbon fiber) added.

The polyamide resin used in the present invention contains a dicarboxylic acid component and a diamine component, and the polyamide resin is obtained by polycondensation of dicarboxylic acid and diamine acid constituting the dicarboxylic acid component and the diamine component. The dicarboxylic acid component constituting the polyamide resin contains terephthalic acid as a main component. By containing the terephthalic acid as a main component, the polyamide resin with excellent high temperature rigidity is obtained. Further, the diamine component constituting the polyamide resin contains 1,10-diaminodecane as a main component. The 1,10-diaminodecane is linear aliphatic diamine. Each of the terephthalic acid and the 1,10-diaminodecane has high symmetry in a chemical structure, and therefore by containing these as main components, the polyamide resin with high crystallinity is obtained.

In the present invention, as described above, the diamine component constituting the polyamide resin contains linear 1,10-diaminodecane of 10C as a main component. Since the number of carbon atoms per a monomer unit of the main component of the diamine component is ten and an even number, a crystal structure becomes stable compared to a configuration in which the number of carbon atoms is an odd number, and therefore crystallinity is improved (even-odd effect). Further, in a case in which the number of carbon atoms of the main component of the diamine component is eight or less, a melting point of the polyamide resin described above might exceed a decomposition temperature. In a case in which the number of carbon atoms of the diamine component is not less than twelve, a melting point of the polyamide resin described above becomes low, and the cage might be deformed under a condition of a high temperature and a high speed. Further, the diamine of 9C or 11C might lack crystallinity due to the even-odd effect of the polyamide resin described above.

In the polyamide resin described above, each of a part of the terephthalic acid as the dicarboxylic component and a part of the 1,10-diaminodecane as the diamine component may be replaced with other copolymerization component. Here, as the other copolymerization component is increased, a melting point and crystallinity are decreased, and therefore it is preferable to set a total amount of the terephthalic acid and the 1,10-diaminodecane as the main components to be not less than 95 mol % based on the total molar number (100 mol %) of raw material monomer. Further, it is further preferable that the polyamide resin substantially consists of the terephthalic acid and the 1,10-diaminodecane and substantially excludes other copolymerization component.

Examples of the dicarboxylic acid component used as the other copolymerization component other than the terephthalic acid include aliphatic dicarboxylic acid such as oxalic acid, malonic acid, succinic acid, glutaric acid, adipic acid, pimelic acid, suberic acid, azelaic acid, sebacic acid, undecanedioic acid and dodecanedioic acid, and alicyclic dicarboxylic acid such as cyclohexanedicarboxylic acid, and aromatic dicarboxylic acid such as phthalic acid, isophthalic acid and naphthalenedicarboxylic acid. Further, examples of the diamine component used as the other copolymerization component other than the 1,10-diaminodecane include aliphatic diamine such as 1,2-ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,11-undecanediamine and 1,12-dodecanediamine, and alicyclic diamine such as cyclohexanediamine, and aromatic diamine such as xylylenediamine. Further, lactam such as caprolactam may be copolymerized with the polyamide resin.

A weight-average molecular weight of the polyamide resin described above is preferably set in a range between 15000 and 50000 and more preferably set in a range between 26000 and 50000. In a case in which the weight-average molecular weight of the polyamide resin described above is less than 15000, rigidity of the polyamide resin is decreased and therefore the cage might be deformed in high speed rotation. On the other hand, in a case in which the weight-average molecular weight of the polyamide resin described above is more than 50000, crystallinity is deteriorated and fluidity in injection molding is decreased. Further, relative viscosity of the polyamide resin described above is not especially limited, however in order to facilitate molding of the cage, it is preferable that the relative viscosity measured at the concentration of 1 g/dL and 25° C. as a catalyst is provided by 96 wt. % sulfuric acid is set to be not less than 2.0.

The melting point of the polyamide resin is preferably not less than 310° C. Further, an upper limit thereof is not especially limited, however it is preferable that the upper limit is set in a range between 320 and 340° C. in view of molding workability. As a range of the melting point, a range between 310 and 340° C. is preferable, a range between 310 and 330° C. is more preferable, and a range between 310 and 320° C. is further more preferable. Since the polyamide resin described above has the melting point higher than and is superior in heat resistance to other polyamide resin (polyamide 66 resin (melting point of 267° C.), polyamide 46 resin (melting point of 295° C.), polyamide 9T resin (melting point of 306° C.)) generally used as the material of the cage, when the cage is used in a condition of a high temperature and high speed rotation in which the dm·n value is not less than $80 \times 10^4$, deformation, seizure, break and the like of the cage can be prevented. Further, the melting point can be measured by using a differential scanning calorimeter (DSC) as an endothermic peak temperature (Tm) appears when the polyamide resin described above is heated by a temperature rising rate of 20° C./min after the polyamide resin is cooled from a molten state toward a temperature of 25° C. by a temperature dropping rate of 20° C./min in an inert gas atmosphere.

The glass transition temperature of the polyamide resin described above is preferably not less than 130° C., more preferably not less than 150° C. Since the polyamide resin described above has the glass transition temperature higher than other polyamide resin (polyamide 66 resin (glass transition temperature of 49° C.), polyamide 46 resin (glass transition temperature of 78° C.), polyamide 9T resin (glass transition temperature of 125° C.)) generally used as the material of the cage, when the cage is used in a condition of a high temperature and high speed rotation in which the dm·n value is not less than $80 \times 10^4$, deformation of the cage can be suppressed and heat generation due to sliding friction between the rolling element and the cage can be made small. Further, the glass transition temperature can be measured by using the differential scanning calorimeter (DSC) as an intermediate temperature (Tg) of a stepped endothermic peak temperature appears when the polyamide resin described above is heated by a temperature rising rate of 20° C./min after the polyamide resin is quickly cooled in an inert gas atmosphere (JIS K7121).

As the fiber reinforcing member added into the polyamide resin provided as the base resin, glass fiber or carbon fiber is adopted. The glass fiber is obtained by spinning inorganic glass which contains $SiO_2$, $B_2O_3$, $Al_2O_3$, CaO, MgO, $Na_2O$, $K_2O$, $Fe_2O_3$ or the like a main component. Generally, non-alkali glass (E glass), alkali glass (C glass, A glass) or the like, can be used. The non-alkali glass is preferable in view of an influence to the polyamide resin described above. The non-alkali glass is formed by borosilicate glass hardly including an alkali component in the composition. Since the alkali component is hardly contained, an influence to the polyamide resin is little and the characteristic of the resin composition is not changed. Examples of the glass fiber include 03JAFT692, MF03MB120, MF06MB120 or the like made by Asahi Fiber Glass Co., Ltd.

As the carbon fiber, polyacrylonitrile-based (PAN) carbon fiber, pitch-based carbon fiber, rayon-based carbon fiber, lignin-poval composition can be utilized without depending on a kind of raw material. Examples of the pitch-based carbon fiber include Kreca M-101S, M-107S, M-101F, M-201S, M-207S, M-2007S, C-103S, C-106S, and C-203S made by Kreha Corporation. Further, examples of the PAN carbon fiber include Besfight HTA-CMF0160-0H, HTA-CMF0040-0H, HTA-C6, and HTA-C6-S made by Toho Tenax Co., Ltd., and Torayca MLD-30, MLD-300, 1008, and 1010 made by Toray Industries, Inc.

In a case in which the glass fiber is adopted as the fiber reinforcing member, a compounded amount thereof is set in a range between 15 and 50 mass % based on the whole resin composition. In a case in which the carbon fiber is adopted as the fiber reinforcing member, a compounded amount thereof is set in a range between 10 and 35 mass % based on the whole resin composition. By setting the glass fiber or the carbon fiber in the range described above, rigidity of the cage can be enhanced and deformation of the cage can be made small under a condition of a high temperature and high speed rotation and a heating value can be made small. Further, in a case in which a shape of the cage is formed such that the cage is forcibly released from a mold in the injection molding or in view of ensuring sufficient strength (tensile strength) of the weld portion, in a case in which the glass fiber is adopted, the glass fiber is preferably set in a range between 20 and 35 mass % based on the whole resin composition, and in a case in which the carbon fiber is adopted, the carbon fiber is preferably set in a range between 15 and 30 mass % based on the whole resin composition.

An addition other than the fiber reinforcing member may be added as needed to the resin composition according to the present invention as long as a function of the cage and injection molding performance are maintained. As other addition, for example, a solid lubricant, an inorganic filler, an antioxidant, an antistatic agent, a mold release agent or the like may be added.

After the materials constituting the resin composition are mixed as needed by a Henschel mixer, a ball mixer, a ribbon blender or the like, the materials are melt-kneaded in a melt extruder such as a twin-screw melt extruder to obtain molding pellets. Further, during melt-kneading in a twin-screw melt extruder or the like, a side feed may be adopted for charging the filler material. By using these molding pellets, the cage is molded by injection molding. During the injection molding, the resin temperature is set to be higher than the melting point of the polyamide resin described above, and a temperature of the molding is set to be lower than the glass transition temperature of the polyamide resin.

As described above, the resin composition as resin material of the cage for the rolling bearing according to the present invention is formed by adding a predetermined amount of the fiber reinforcing member (glass fiber or carbon fiber) into the predetermined polyamide resin, and therefore the melting point and the glass transition temperature are high, and excellent heat resistance, oil resistance, chemical resistance, dimensional stability, toughness and high mechanical characteristics are provided. Thus, the cage for the rolling bearing according to the present invention can be endured in a long term usage under a severe environmental condition in a high speed rotation range or the like (a high temperature atmosphere, a condition in which oil or chemical is contacted, a high speed rotation condition, a high load condition, a high humidity environment or the like).

Further, the resin composition described above has low water absorption performance, and therefore dimensional change and deterioration of physical properties in accordance with swelling and/or expansion due to water absorption and/or moisture absorption can be suppressed. The cage for the rolling bearing according to the present invention has excellent dimensional stability and therefore a cage for the usage in which precision is required can be provided at low cost.

In the polyamide resin used in the present invention, plant-derived material may be used as the dicarboxylic acid component or the diamine component. For example, 1,10-diaminodecane in which castor oil is used as starting raw material can be used. By adopting biomass-derived material such as a plant, a substantial carbon dioxide emission in incineration of the resin cage can be reduced compared to a cage in which the biomass-derived material is not used. Here, whether or not the plant plastics are biomass-derived can be determined by measuring the concentration of 14C which is a radioactive isotope of carbons composing the resin. Because the half-life of 14C is 5730 years, 14C is not contained in carbon derived from a fossil resource which is generated in the elapse of not less than 10 million years. For this reason, when 14C is contained in the carbon derived from the fossil resource, it is possible to determine that the plant plastic contains at least the biomass-derived material.

Figure 2:
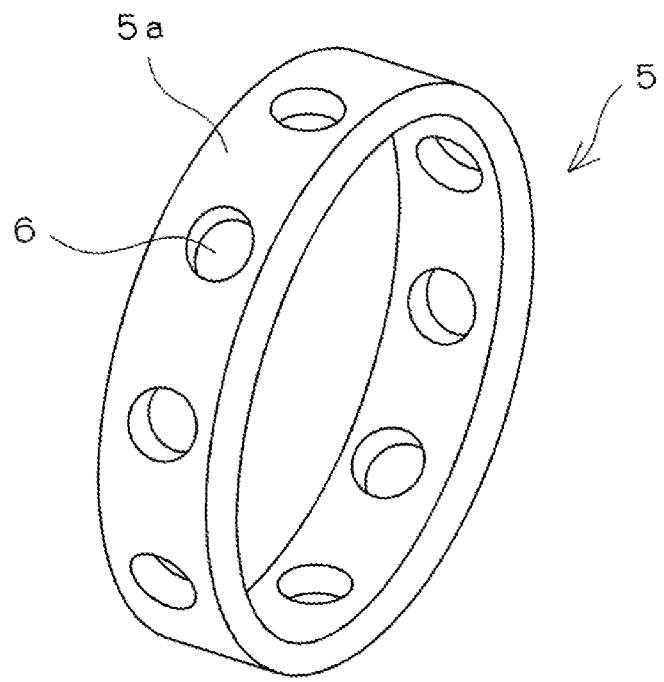
FIGS. 2(a) and 2(b) are a perspective view and the like of a machined resin cage.
Figure 2:
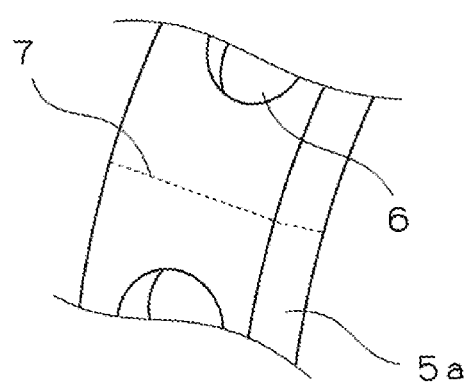

The cage for the rolling bearing and the rolling bearing according to the present invention are described with reference to FIG. 1 and FIGS. 2(a) and 2(b). FIG. 1 is a cross-sectional view in an axial direction of an angular ball bearing as one example of the rolling bearing according to the present invention. FIGS. 2(a) and 2(b) are a perspective view and a partially enlarged view of a cage (a machined cage) in the rolling bearing in FIG. 1. As shown in FIG. 1, an angular ball bearing 1 is provided with an inner ring 2, an outer ring 3, a plurality of rolling elements 4 interposed between the inner ring 2 and the outer ring 3, and a cage 5 which retains the rolling elements 4 in a circumferential direction at regular intervals. The cage 5 corresponds to the cage for the rolling bearing described above according to the present invention. The inner ring 2 and the outer ring 3 are contacted with the rolling element 4 at a predetermined angle θ (contact angle) against a center line in a radial direction, and therefore a radial load and an axial load in one direction of the axial load can be received. A lubricant such as grease is sealed as needed around the rolling element 4 to lubricate the rolling element 4.

The angular ball bearing 1 as show in FIG. 1 is used in high speed rotation or the like. In the present invention, as the cage 5 thereof, since an injection molding body of the resin composition containing the polyamide resin as the base resin with a high glass transition temperature and excellent rigidity is used, the deformation of the cage can be suppressed under a condition of a high temperature and high speed rotation. Further, since the polyimide resin described above has excellent self-lubricant performance and low friction performance, a heating value due to friction between the rolling element 4 and the cage 5 can be made small, and the temperature rising is suppressed and therefore seizure is not generated. Accordingly, the bearing can be driven for a long period of time under a condition of a high temperature and high speed rotation.

As shown in FIG. 2(a), in the cage 5, a plurality of pockets 6, which retains balls as the rolling elements, is arranged in a ring-shaped cage body 5a in the circumferential direction at regular intervals. The pocket 6 have a depressed circle in the plane shape of the pocket 6, however may have a perfect circle. Here, the depressed circular shape means a configuration composed of the radius of a pocket surface almost approximate to the radius of each of balls disposed at both sides of a gap amount coincident with the amount of a pocket gap (difference between the inner diameter of the pocket and the diameter of the ball) required in the perfect circle. With such a shape, a load applied to the cage can be decreased by increasing the pocket gap amount in the circumferential direction of a rotation axis to absorb gain and delay of the ball.

The cage 5 is formed as a machined cage obtained after molding the resin composition described above into a semi-finished product by injection molding and thereafter subjecting the semi-finished product to cutting work to process the pocket part. As shown in FIG. 2(b), since the cage 5 is formed as an injection molding body, a weld portion 7 is formed in a region in which the resin composition is joined during the molding. The weld portion 7 is a part easily broken due to stress concentration in the ring-shaped cage. In the cage according to the present invention, since the molding body is obtained by molding the resin composition in which a predetermined amount of the fiber reinforcing member (glass fiber or carbon fiber) is added into the polyamide resin provided as the base resin by the injection molding, excellent tensile strength is provided at the weld portion 7 and therefore a crack of the weld portion can be prevented in the usage of high speed rotation. Specifically, as described in examples below, the tensile strength is high compared to a configuration in which the base resin is replaced with other polyamide resin.

In FIG. 1 and FIGS. 2(a) and 2(b), the angular ball bearing is described as an example of the rolling bearing according to the present invention, however a bearing type to which the present invention can be applied is not limited to this, and the present invention can be also applied to other ball bearing, a conical roller bearing, a self-aligning roller bearing, a needle roller bearing and the like.

Figure 3:
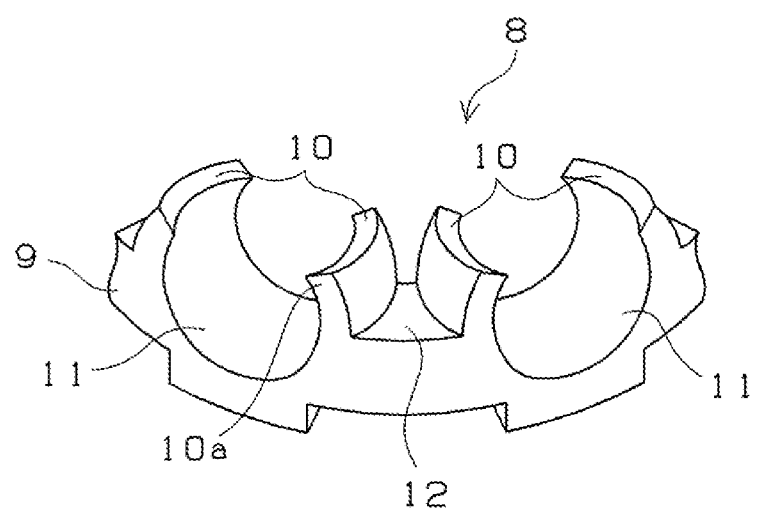
FIG. 3 is a partially enlarged perspective view of a crown type resin cage.

A crown type cage for a rolling bearing as other example of the cage for the rolling bearing according to the present invention is described with reference to FIG. 3. FIG. 3 is a partially enlarged perspective view of the crown type cage obtained by injection molding the resin composition described above. As shown in FIG. 3, a cage 8 has a pair of opposing retention claws 10 on an upper surface of a ring-shaped cage body 9 at a certain interval in the circumferential direction, and the cage 8 is bent in a direction in which the respective opposing claws 10 are close to each other, and the cage 8 has a pocket 11, which retains a ball as a rolling element, formed between the retention claws 10. Further, the a flat portion 12 provided as a rising reference surface of the retention claw 10 is formed between back faces of the retention claws 10 adjacent to each other in the pockets 11 adjacent to each other. The retention claw 10 has a curved distal end portion 10a.

In a case in which the crown type cage shown in FIG. 3 is molded by injection molding, the curved distal end portion 10a of the retention claw 10 is forcibly released from a mold. This is because a diameter of an opening part of the pocket is smaller than an inner diameter of the pocket 11 and the mold of the inner diameter, which molds the pockets, is elastically spread such that the diameter of the opening part of the pocket is to be the same distance as the inner diameter of the pocket when the pocket 11 is released from the mold. In the cage according to the present invention, since the resin composition described above is used as the material for the cage, a crack or whitening of the distal end portion of the retention claw can be prevented when the cage is released forcibly from the mold during the molding while keeping high rigidity of the cage in use. Especially, as described above, by setting the compounded amount of the fiber reinforcing member included in the resin composition to be in a range between 20 and 35 mass % based on the whole resin composition in a case in which the glass fiber is adopted, or in a range between 15 and 30 mass % based on the whole resin composition in a case in which the carbon fiber is adopted, the crack or the whitening is easily prevented.

EXAMPLES

Hereinafter, the present invention is further described by using examples, however the present invention is not especially limited by the examples.

Raw materials used in the examples and comparative examples are collectively described below.

(1) Resin Material

Polyamide resin A: resin containing terephthalic acid and 1,10-diaminodecane as the main components (XecoT XN500 made by Unitika Ltd.)

Polyamide 66 resin: Amilan CM3001 made by Toray Industries, Inc.

Polyamide 46 resin: Stanyl TW300 made by DSM N.V.

Polyamide 9T resin: Genestar N1000 made by Kraray Co., Ltd.

(2) Fiber Reinforcing Member

Glass fiber: 03JAFT692 made by Asahi Fiber Glass Co., Ltd. (average fiber diameter of 10 μm, average fiber length of 3 mm)

Carbon fiber: HTA-C6 made by Toho Tenax Co., Ltd. (average fiber diameter of 7 μm, average fiber length of 6 mm)

Examples 1 to 6, Comparative Examples 1 to 6

The cages for the angular ball bearing according to the examples and the comparative examples were produced by using the resin compositions in which the raw materials are compounded with a ratio shown in Table 1, and various tests were conducted. The composition is produced by using a twin-screw extruder. In order to prevent break of the glass fiber and the carbon fiber, the glass fiber and the carbon fiber are charged by using a constant side feed and then granulated by extrusion. The obtained molding pellets is molded by an inline screw type injection molding machine to obtain a desired cage shape (outer diameter of 93 mm, inner diameter of 88 mm, width of 13 mm). Further, the cage is formed in a machined cage as shown in FIGS. 2(a) and 2(b). The cage into which water was absorbed by applying moisture adjustment processing in an atmosphere of temperature of 80° C. and relative humidity of 95% after molding was subjected to each test. A water absorption rate was measured from weight of the obtained cage before and after the moisture adjustment by using a calculation expression described below. The result is shown in Table 1.

Calculation Expression of Water Absorption Rate

Figure 4:
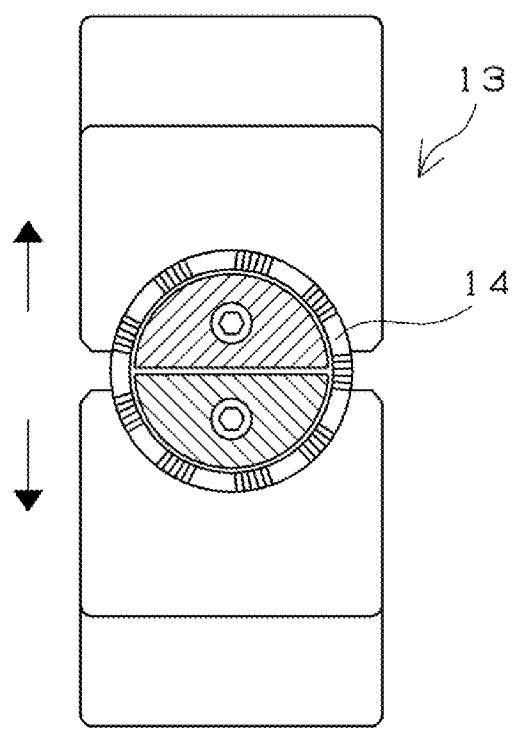
FIG. 4 is a view illustrating an outline of a cage tensile test.

Water absorption rate(wt %)=(Weight after moisture adjustment−Weight before moisture adjustment)×100/Weight before moisture adjustment Cage Tensile Test In order to check breakdown strength (tensile strength of the weld portion) of the cage according to the present invention, a cage tensile test was conducted by using the produced cages. The cage tensile test was conducted by setting a test cage 14 on a ring-shaped tensile jig 13 shown in FIG. 4 such that the weld portion is matched with a horizontal position, and the cage tensile test was conducted by using a tensile test machine (Autograph AG50KNX) made by Shimadzu Corporation at a tensile speed of 10 mm/min. The result is shown in Table 1.

Bearing Temperature Test

A bearing test of the angular ball bearing in which a rotation speed is asymptotically increased until the dm·n value becomes $80 \times 10^4$ was conducted. A comparative test was conducted by using the angular ball bearing in which each of the cages of the examples and the comparative examples is installed and grease as a lubricant is sealed and non-contact type seals are arranged at both sides to seal the angular ball bearing. In the test, an outer ring temperature was measured, and the angular ball bearing having a rising temperature of less than 30° C. is defined to be acceptable and the angular ball bearing in which the temperature is raised not less than 30° C. is defined to be unacceptable as a reference temperature is defined as 30° C. in view of precision and durability. The result is shown in Table 1.

TABLE 1

|  | EXAMPLE | | | | | | COMPARATIVE EXAMPLE | | | | | |
|---|---|---|---|---|---|---|---|---|---|---|---|---|
|  | 1 | 2 | 3 | 4 | 5 | 6 | 1 | 2 | 3 | 4 | 5 | 6 |
| Composition (wt %) | | | | | | | | | | | | |
| (1) Resin Material | | | | | | | | | | | | |
| Polyamide resin A | 85 | 50 | 90 | 65 | 80 | 70 | — | — | — | 90 | 40 | 60 |
| Polyamide 66 resin | — | — | — | — | — | — | 70 | — | — | — | — | — |
| Polyamide 46 resin | — | — | — | — | — | — | — | 70 | — | — | — | — |
| Polyamide 9T resin | — | — | — | — | — | — | — | — | 70 | — | — | — |
| (2) Fiber reinforcing member | | | | | | | | | | | | |
| Glass fiber | 15 | 50 | — | — | — | 30 | 30 | 30 | 30 | 10 | 60 | — |
| Carbon fiber | — | — | 10 | 35 | 20 | — | — | — | — | — | — | 40 |
| Water absorption rate (%) | 0.7 | 0.4 | 0.7 | 0.5 | 0.6 | 0.6 | 2.1 | 3.5 | 0.6 | 0.7 | 0.4 | 0.4 |
| Cage breakdown strength (N) | 2050 | 2100 | 2100 | 2130 | 2300 | 2200 | 1750 | 1820 | 1780 | 1950 | 1800 | 1950 |
| Cage tempeature rise (° C.)* | o | o | o | o | o | o | x | x | x | x | o | o |

*temperature rise is less than 30° C. is described as o,
temperature rise is more than 30° C. is described as x Relating to the cage tensile test, the breakdown strength (the tensile strength of the weld portion) of the cage is required to be high because of a usage condition in which the dm·n value is not less than $80 \times 10^4$. As shown in Table 1, each of the cages according to the examples of the present invention has sufficient strength of not less than 2000 N. On the other hand, each of the cages according to the comparative examples 1 to 6 has strength of less than 2000 N.

Relating to the bearing temperature test, as shown in Table 1, in the comparative examples 1 to 4, the outer ring temperature is quickly increased up to not less than 30° C. after the dm·n value exceeds $70 \times 10^4$. On the other hand, in the examples according to the present invention, the outer ring temperature is not quickly increased until the dm·n value becomes $80 \times 10^4$, and the temperature is kept lower than 30° C.

INDUSTRIAL APPLICABILITY

In the cage for the rolling bearing according to the present invention can be used as various cages for the rolling bearing adopted in vehicles, motors, machine tools or the like because the seizure and the break are not generated in a condition of a high temperature and high speed rotation. Especially, the cage is suitable to a cage for a bearing used in high speed rotation in which the dm·n value is not less than $80 \times 10^4$.

EXPLANATION OF REFERENCE NUMERALS AND SYMBOLS

1: angular ball bearing (rolling bearing)
2: inner ring
3: outer ring
4: rolling element
5: cage
6: pocket
7: weld portion
8: cage
9: cage body
10: retention claw
11: pocket
12: flat portion
13: tensile jig
14: test cage

The invention claimed is:

1. A cage for a rolling bearing formed by injection molding a resin composition, wherein:
    the resin composition comprises polyamide resin made from a dicarboxylic acid component and a diamine component as a base resin and a fiber reinforcing member added thereto;
    the dicarboxylic acid component contains terephthalic acid as a main component;
    the diamine component contains 1,10-diaminodecane as a main component; and
    the resin composition contains, as the fiber reinforcing member, 15 to 50 mass % of glass fibers or 10 to 35 mass % of carbon fibers based on the resin composition.

2. The cage for the rolling bearing according to claim 1, wherein the polyamide resin has a melting point of not less than 310° C.

3. The cage for the rolling bearing according to claim 1, wherein a remaining part other than the fiber reinforcing member in the resin composition consists of the polyamide resin.

4. The cage for the rolling bearing according to claim 1, wherein the polyamide resin contains radioisotope carbon 14.

5. A rolling bearing comprising: an inner ring; an outer ring; a plurality of rolling elements interposed between the inner ring and the outer ring; and a cage which retains the rolling elements, wherein the cage is a cage for a rolling bearing according to claim 1.

6. The rolling bearing according to claim 5, wherein the rolling bearing is used in high speed rotation in which a dm·n value is not less than $80 \times 10^4$.

* * * * *